…

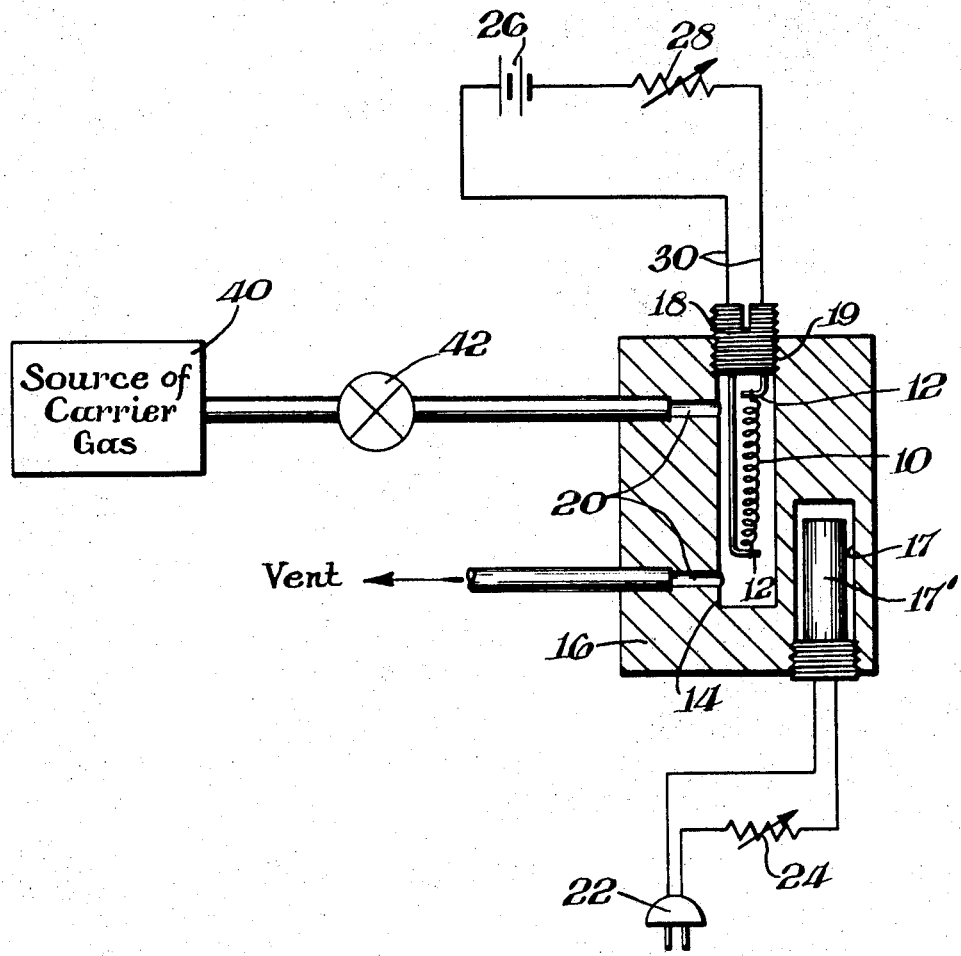
INVENTORS
Edward W. Cieplinski
Samuel E. Spencer
William L. Illingsworth
BY
Mortenson and Weigel
ATTORNEYS

United States Patent Office

3,537,914
Patented Nov. 3, 1970

3,537,914
PASSIVATION OF THERMAL CONDUCTIVITY FILAMENTS
Edward W. Cieplinski and Samuel F. Spencer, Wilmington, Del., and William L. Illingsworth, Greenridge, Pa., assignors to Hewlett-Packard Company, Palo Alto, Calif., a corporation of California
Filed Jan. 19, 1968, Ser. No. 699,239
Int. Cl. C23f 7/02; H01c 7/04
U.S. Cl. 148—6.3      5 Claims

ABSTRACT OF THE DISCLOSURE

The tungsten-rhenium filament of a thermal conductivity detector is passivated by heating the detector block to 330° C., heating the filament to a somewhat higher temperature, purging the block cavity containing the filament with a carrier gas containing a mixture of an inert gas and oxygen, and maintaining said temperatures and purge gas flow for a period of time sufficient to coat at least the tungsten portion of the filament with an oxide coating. The effect of this passivation on the detector output signal of a gas chromatograph is to reduce tailing, baseline shifts, and other vagaries due to filament oxidation.

---

This invention relates to a method of passivating the filaments of thermal conductivity detectors and, more particularly, to a method of passivating tungsten and tungsten alloy filaments utilized in thermal conductivity detectors.

BACKGROUND OF THE INVENTION

A common method employed to determine the concentration of various gaseous components, for example, those eluting from a gas chromatograph, is to pass the gas stream containing the components through a measuring cell containing an electrically energized, current carrying, temperature sensitive transducer element. The transducer element is coupled to a suitable measuring device, usually a bridge type circuit, which relates the electrical behavior of the transducer to the concentration of the component within the cell.

One such measuring cell is known as a thermal conductivity cell. Essentially, a thermal conductivity cell includes a heat absorbing block having a cavity or cavities therein through which the carrier gas flows. The transducer or detecting element included in the cell is a heated element, typically a thermistor or resistance wire which is positioned centrally in the cavity. The rate at which the wire loses heat to the surrounding block is dependent upon the thermal conductivity of the gas.

When used to continuously monitor the output of an analytical instrument such as a gas chromatograph, the fluid comprising the carrier gas and any eluted separated sample components from the gas chromatograph are passed through the measuring cell, at a rate of flow appropriate to the particular gas mixture under analysis. A suitable energizing current is passed through the detecting element. The fluid flowing through the cell passes over and around the electrically energized detecting element and continuously removes the heat generated by the electric current. Due to the thermal conductivity of the carrier gas and its rate of flow, the detecting element achieves a definite temperature and a temperature gradient is established between the detecting element and the measuring cell wall. Under these circumstances the transducer assumes a particular value of electrical resistance within its linear or unsaturated range of operation.

As the components of a sample of the fluid stream under analysis are separated and passed through the measuring cell, the temperature of the detecting element changes. Hence, the temperature of the detecting element at a given time, is dependent on the thermal conductivity of the fluid therein, which, in turn, is a function of the concentration of the sample component passing through the cell at any given time.

Unfortunately, many problems associated with oxidation of the filaments have been encountered with thermal conductivity detectors. Oxidation may occur either as a result of oxygen leakage into the measuring cell or by the filament's exposure during usage when samples of air are passed through the detector. Extreme caution must be taken to keep the measuring and reference cells free of oxygen, particularly when the filaments are hot. Whatever the source, oxidation of the filaments usually causes continuous shifts of the baseline resulting in measurement errors. It has been suggested that the resulting shifts or unbalance of the cell or the inability to zero the cell resulting from this oxidation can be eliminated or reduced by operating the cell at a lower current. As another alternative, it has been suggested that the sample and reference cells can be switched after a small amount of oxidation has occurred on the sample filaments. Thus as the new sample filaments (formerly the reference filaments) are oxidized the bridge unbalance will gradually return to its initial condition. All of these techniques are manifestly unsatisfactory.

It is, therefore, an object of this invention to obviate many of the disadvantageous resulting from oxidation of the filaments of thermal conductivity detectors.

Another object of this invention is to passivate the filaments of a thermal conductivity detector.

BRIEF DESCRIPTION OF THE INVENTION

In accordance with the preferred method of this invention, the tungsten and/or tungsten alloy filament of a thermal conductivity detector is passivated by heating the detector block to a temperature in excess of 300° C., heating the filament of the detector to a temperature in excess of 300° C., passing a carrier gas including at least 1% oxygen by volume through the cavity in which the filament is disposed for a period of time sufficient to form a tungsten oxide coating on the surface of the filament while the temperatures of the filament and the block are maintained. This oxide coating is relatively stable and causes the filament to become more inert without appreciable loss of sensitivity.

BRIEF DESCRIPTION OF THE DRAWINGS

The novel features that are considered characteristic of this invention are set forth with particularity in the appended claims. The invention, itself, however, both as to its organizatiton and method of operation, as well as additional objects and advantages thereof, will best be understood from the following description when read in connection with the accompanying drawings, in which the sole figure is a view taken in cross-section illustrating a typical thermal conductivity detector including the control elements necessary to follow the method of this invention.

DESCRIPTION OF THE PREFERRED METHOD OF THIS INVENTION

Since the method of this invention contemplates performing certain steps upon an existing thermal conductivity detector, it is deemed best to describe such a detector in the first instance. In the figure, a typical thermal conductivity detector is shown as including a filament 10 in the form of a helix which may have approximately 140 turns of a tungsten or tungsten alloy such as tungsten-rhenium wire. During processing the filament wire is stress relieved by appropriate heat treatment. The filament 10 is supported at either end by rigid support wires 12 so as to be axially disposed within a cylindrical cavity or housing 14 to form the detector cell. The cylindrical cavity 14 may be formed as by drilling in a cast block 16 of a suitable heat conductive material such as brass or stainless steel. A cartridge heater 17' is inserted in a separate cavity 17 which may be drilled in the block. When energized, the heater 17 heats the entire block to the desired operating temperature. The support wires 12 are mounted in a suitable electrically insulating gland 18 which is positioned as by screw threads 19 in the open end of the chamber 14.

A gas whose thermal conductivity is to be sensed or detected is passed through the cavity 14 by way of exit and entry ports 20 which may be drilled radially into the cavity 14 through the block 16. Since the operation of this cell is conventional, such operation will not be described further except to state that generally great care must be taken in the operation of thermal conductivity cells to avoid oxidation of the filaments. Without such care, tailing, baseline shift and inability to zero the cell can and do occur. Very surprisingly, it has been found that, contrary to present practice and thought, filaments of tungsten and alloys thereof can be passivated by controlled oxidation without significant loss of sensitivity.

In accordance with the preferred method of this invention, tungsten and tungsten alloy filaments are passivated firstly by energizing the cartridge heater 17' by a source of power such as alternating current source 22 which is coupled through a variable impedance element or rheostat 24 to the cartridge heater 17'. The heat applied to the cartridge heater 17' is varied in order to raise the cell block temperature preferably to a minimum temperature in excess of 275° C. and somewhat less than 500° C. A temperature of 350° C. is preferred. Next the filament 10 is energized by an external power source such as that supplied by a source of potential illustrated as a battery 26 connected through a variable impedance 28 to the wire leads 30 which supply current to the filament 10. The current through the filament 10 preferably is adjusted to bring the filament up to a minimum temperature in excess of 275° C., typically at least 300° C. but preferably less than a maximum temperature of 600° C. A filament temperature of 400° C. is preferred.

Thirdly, after the filament 10 has been brought up to temperature, carrier gas from a suitable source 40 is permitted to pass through a conventional flow regulator 42 and suitable conduits 20 into the upper portion of the cavity 14, thence out of the bottom of the cavity 14 to vent. The pressure and resulting flow rate of the carrier gas may be varied anywhere from static, or zero, up to a maximum flow rate of 250 milliliters per minute. Generally, the lower flow rates are preferred and, in many cases, operation under static flow conditions produce quite satisfactory results. For static flow conditions, the carrier gas is permitted to diffuse into the cell. The carrier gas selected may be pure oxygen or any other carrier gas containing a mixture of at least 1% oxygen by volume and an inert gas. Mixtures containing less than 1% oxygen have generally failed to permit the oxidation of the filament to go to completion resulting in some instability.

Fourthly, the purging of the cavity 14 is continued for a period of time sufficient to form an oxide coating on the tungsten filament 10. This time period will vary, of course, as a function of the temperature of the filament and the flow rate of the carrier gas. Typically, block temperatures of 350° C., filament temperatures in the order of 450° C., and one to two hours of treatment time have been found to be quite satisfactory. If the filament temperature is increased to say 375° C., the time treatments of one-half hour to forty-five minutes have been found satisfactory. After the time period has elapsed, the carrier gas, filament current supply, and cartridge heater supplies are turned off and the thermal conductivity cell is now passivated and ready for use.

The effect of this passivation, which is useful only with tungsten and tungsten alloy filaments, is to render the filament more inert without appreciable loss of sensitivity. Subsequent tailing, baseline shifts, and instability thus are appreciably reduced. The oxide coating on filaments passivated by this treatment has been found by analysis to approach a tungsten oxide ($WO_3$), which is known to be a stable oxide of tungsten. In actual cases, tungsten-rhenium filaments so treated have been analyzed by X-ray diffraction techniques and found to contain an oxide coating of $W_{20}O_{58}$ indicating both tungsten and tungsten oxide. No rhenium oxide was detected. Among the carrier gases that have been employed satisfactorily are included mixtures of helium and oxygen, nitrogen and oxygen, or for that matter air itself.

It is obvious that many embodiments may be made of this inventive concept, and that many modifications may be made in the embodiments hereinbefore described. Therefore, it is to be understood that all descriptive matter herein is to be interpreted merely as illustrative, exemplary, and not in a limited sense. It is intended that various modifications which might readily suggest themselves to those skilled in the art be covered by the following claims, as far as the prior art permits.

What is claimed is:

1. In a thermal conductivity detector having a heat absorbing block defining a cavity therein, a filament formed of the group consisting of tungsten and alloys thereof disposed in said cavity, and conduits for passing a carrier gas through said cavity, the method of passivating said filament comprising the steps of:
   heating said filament to a temperature sufficient to form an oxide coating thereon, and
   exposing said filament to a carrier gas containing at least one percent oxygen by volume for a period of time sufficient to form said oxide coating, thereby to render said filament more inert without appreciable loss of sensitivity,
   said step of exposing said filament including flowing said carrier gas through said cavity.

2. The method according to claim 1 including the step of maintaining said filament at a temperature in excess of 275° C. during said exposure.

3. The method according to claim 2 wherein said carrier gas is air.

4. The method according to claim 2 wherein said carrier gas is oxygen.

5. The method according to claim 4 wherein said filament is tungsten doped with rhenium, thereby to form a coating of tungsten oxide on said filament.

References Cited

UNITED STATES PATENTS

| | | | |
|---|---|---|---|
| 1,856,258 | 5/1932 | Lederer | 148—6.3 X |
| 1,880,937 | 10/1932 | Elsey | 148—6.3 |
| 1,988,291 | 1/1935 | Yamashita | 148—6.3 |

RALPH S. KENDALL, Primary Examiner

U.S. Cl. X.R.

73—23.1, 27; 117—231; 338—23